United States Patent Office

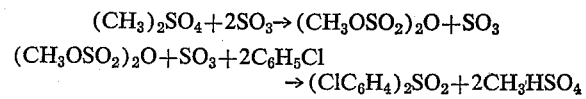

3,309,409
PURIFICATION OF ACIDIC CHLOROPHENYL-
SULFONES
Edward L. Steiger, Toledo, Ohio, assignor to Stauffer
Chemical Company, Weston, Mich., a corporation of
Delaware
No Drawing. Filed Apr. 10, 1964, Ser. No. 358,950
3 Claims. (Cl. 260—607)

This invention relates to an improved method for the preparation of pure 4,4'-dichlorodiphenylsulfone. More specifically, this invention is an improvement in the method of preparation of this compound as taught in U.S. Patent 2,971,985.

A method for producing 4,4'-dichlorodiphenylsulfone is described in U.S. Patent No. 2,971,985. However, it has been found impossible to wash the product completely acid-free and extremely difficult to achieve a wash water pH above 2, well below the pH of 5 taught by the patent.

It is believed that the product achieved by the patentee contained a considerable amount of encapsulated acid and water so that less than a 90% yield was achieved. While there is no reason to believe that patentee's product was unsuitable for utilization directly for the preparation of 4,4'-diaminodiphenylsulfone without further purification, there is a need for a purer product. Efforts to achieve a pure product by the patented process have been futile. The product from that process is a brownish apparently amorphous material which approaches an off-white with subsequent recrystallizations. Recrystallization can be accomplished using acetone or an aromatic hydrocarbon such as benzene, toluene, or xylene, but achieving high purity product by recrystallization of the product of the above patent results in substantially reduced yields.

It has been further found that of the sulfone produced by the method of the above-identified patent about 90–92% of the product was the desired 4,4'-dichlorodiphenylsulfone; this is possibly the 90% yield to which the patent refers. The rest of the product consisted of other isomers, encapsulated acid, unreacted compounds and water.

The principal object of this invention is to improve the purity of crude 4,4'-dichlorodiphenylsulfone resulting from the reaction of chlorobenzene, sulfur trioxide and dimethylpyrosulfate as, for example, described in the above U.S. patent. Another object is to produce a product which has higher isomeric purity than previously attainable. These objects, as well as others which are apparent from the following description, are satisfied by this invention.

This invention consists of a method for isolating at least about 97% pure 4,4'-dichlorodiphenylsulfone from an acidic reaction product comprising heating a mixture of (A) the acidic reaction product and (B) a basic aqueous solution having a pH greater than 7, the base in said solution being such as to produce a water-soluble sulfate, said base being present in an amount sufficient at least to neutralize the acidic reaction product mixture, at a temperature ranging from about 80° C. to about 90° C. for at least about 30 minutes. The product can be filtered hot or can be cooled prior to filtering. However, the filtered precipitate must be washed with hot water to remove the soluble sulfate salts.

The method of this invention produces yields of at least about 65 to 70% of the theoretical of a product which is pure white and which is over 97% 4,4'-dichlorodiphenylsulfone, an excellent result for reagent grade material from commercial production. This product can be dissolved in toluene at 90° C., filtered hot, cooled to room temperature, e.g. 20° C. to 25° C., and filtered again to give yields of 75 to 80% based on the crude product of a product having a freezing point of 147.8–147.9° C., equivalent to over 99% pure 4,4'-dichlorodiphenylsulfone.

The basic reactions for producing the desired sulfone for the benefits of this invention are:

$$(CH_3)_2SO_4 + 2SO_3 \rightarrow (CH_3OSO_2)_2O + SO_3$$
$$(CH_3OSO_2)_2O + SO_3 + 2C_6H_5Cl$$
$$\rightarrow (ClC_6H_4)_2SO_2 + 2CH_3HSO_4$$

These reactions are set forth in the above-identified patent. After these reactions are complete, the system is liquid above about 45° C. As this liquid product mixture is added to a wash system such as the wash water described in U.S. 2,971,985 or the basic solution described above, a lumpy, sticky, dirty brown precipitate forms. This precipitate is more pronounced in the neutral water system than in the basic solution system.

In either case, the method of this invention is unexpectedly beneficial in that any acidic sulfone product, such as that from the above reactions as employed in the above-identified patent or as described herein, can be treated by mixing it with the above-defined basic solution at a temperature ranging from the freezing point of the solution to about 90° C., preferably from about 15° C. to 60° C., and heating the resulting system for at least 30 minutes to produce over 97% pure 4,4'-dichlorodiphenylsulfone. Cooking the neutralized sulfone product precipitate per the method of this invention changes the product consistency from a lumpy, tacky agglomeration to a smooth slurry. While the crude lumps are a dirty dark brown, the slurry particles are pure white.

In order to achieve the full benefits of this invention, it is preferable that the heating step last for at least one hour. As a practical matter, more than about two hours of heating produces only marginal product improvement.

The most common bases which can be used in the basic solution employed herein are the alkali metal hydroxides, especially sodium hydroxide and potassium hydroxide, but any base which is sufficiently water soluble to produce the necessary basic aqueous solution and which produces a water-soluble sulfate can be employed. Examples of such bases other than the alkali metal hydroxides include sodium carbonate, ammonia and quaternary ammonium hydroxides such as the tetramethylammonium hydroxide.

The method of this invention is especially useful if the preparation of the acidic reaction product mixture is altered from that taught in the patent as shown in the following example. Dimethyl sulfate is heated to 70–75° C. and liquid sulfur trioxide of high purity is added with agitation in stoichiometric quantity. The system is then cooled after which the chlorobenzene is added. This technique permits all preliminary preparations in a single vessel. While the temperature during the chlorobenzene addition can range from about 20° C. to 90° C., it is impractical as a matter of procedural time to hold the temperature down even to 50° C. due to the heat evolved during the chlorobenzene additions. However, at temperatures above about 90° C. the reflux of SO₃ becomes too vigorous, and chlorobenzene starts to reflux thus interfering with the desired reaction.

The following example illustrates this invention without, however, limiting it.

EXAMPLE

Dimethyl sulfate was heated to 70–75° C. Liquid sulfur trioxide of high purity in an amount equal to one mole of sulfur trioxide per mol of dimethyl sulfate was added with agitation under the liquid surface over a period of 20 minutes, and the mixture was heated with agitation at 70–75° C. for an additional 30 minutes. The reaction mixture was then cooled to 50° C., and additional sulfur trioxide in an amount equal to the amount added previously was added under the liquid surface, the temperature of the system being maintained at from 50–55° C. Chlorobenzene in an amount equal to two mols of chlorobenzene per mol of dimethylsulfate employed in the first step was added cautiously over a 20 minute period, the system being cooled to hold the temperature in the range of 50–55° C. After the chlorobenzene addition was complete, the system was heated to maintain a temperature of 50–55° C. for one hour. The liquid mixture at 50–55° C. was then introduced slowly into an alkaline solution at 80–90° C., the solution being water containing an alkali metal hydroxide, e.g. NaOH or KOH, in a molar amount equal to the total amount of sulfur trioxide employed, i.e. two mols of hydroxide per mol of sulfur trioxide added in the second step above. The final mixture, which was almost immediately a slurry containing a dirty brown, lumpy precipitate, was heated at 80–90° C. for about 1 hour during which the precipitate turned into fine pure white particles which were subsequently filtered; the solid product was then washed with water at 80–90° C. and dried at less than 100° C., preferably under a vacuum. This product was over 97% pure 4,4'-dichlorodiphenylsulfone having a melting point of 144.9° C.

Various modifications and substitutions can be made, without departing from the spirit or scope of this invention as defined in the appended claims.

Having thus described my invention, I claim:

1. The method of improving the purity of crude acidic 4,4'-dichlorodiphenylsulfone which comprises heating a mixture of the crude material and a basic aqueous solution having a pH greater than 7 at a temperature ranging from about 80° C. to about 90° C. for at least 30 minutes and recovering the resulting white precipitate from the mixture, the base in said solution being such as to produce a water soluble sulfate and being employed in an amount sufficient to neutralize the said material.

2. The method of improving the purity of crude acidic 4,4'-dichlorodiphenylsulfone comprising mixing the crude material and a basic aqueous solution having a pH greater than 7 at a temperature ranging from the freezing point of the solution to about 90° C., heating the mixture at a temperature ranging from about 80° C. to about 90° C. for at least about 30 minutes and recovering the resulting white precipitate from the mixture, the base in said solution being such as to produce a water soluble sulfate and being present in an amount sufficient to neutralize the said crude material.

3. Method according to claim 2 when an alkali metal hydroxide is employed as the base.

No references cited.

CHARLES B. PARKER, *Primary Examiner.*
DELBERT R. PHILLIPS, *Assistant Examiner.*